United States Patent [19]

Cantoni

[11] Patent Number: 5,610,936
[45] Date of Patent: Mar. 11, 1997

[54] EXTENDED MULTIPLY FOLDED OPTICAL PATHS

[75] Inventor: Armando Cantoni, Huntsville, Ala.

[73] Assignee: Technology Development Corporation, Huntsville, Ala.

[21] Appl. No.: 534,947

[22] Filed: Sep. 28, 1995

[51] Int. Cl.⁶ ...................................................... H01S 3/081
[52] U.S. Cl. ............................... 372/93; 372/98; 372/99; 372/64; 372/97
[58] Field of Search ..................... 372/92–94, 98, 372/99, 64, 95; 378/97, 107, 108

[56] References Cited

U.S. PATENT DOCUMENTS

| | | | |
|---|---|---|---|
| 3,361,987 | 1/1968 | DeMaria | 372/94 |
| 4,429,398 | 1/1984 | Chenausky et al. | 372/64 |
| 4,438,514 | 3/1984 | Chenausky et al. | 372/64 |
| 4,719,639 | 1/1988 | Tulip | 372/66 |
| 4,807,232 | 2/1989 | Hart et al. | 372/18 |
| 4,807,233 | 2/1989 | Hart et al. | 372/18 |
| 4,807,234 | 2/1989 | Hart et al. | 372/18 |
| 4,813,052 | 3/1989 | DeMaria et al. | 372/64 |
| 4,815,094 | 3/1989 | Cantoni | 372/93 |
| 4,870,654 | 9/1989 | Cantoni et al. | 372/93 |
| 4,939,738 | 7/1990 | Opower | 372/95 |
| 5,031,190 | 7/1991 | Behfar-Rad | 372/92 |
| 5,079,773 | 1/1992 | Hart et al. | 372/18 |
| 5,132,983 | 7/1992 | Behfar-Rad | 372/92 |

OTHER PUBLICATIONS

"10.6–μm Waveguide Laser Power Amplifier" by Marvin B. Klein and Richard L. Abrams, IEEE Journal of Quantum Electronics, Aug. 1975.

"Characteristics of a Single–Frequency Sealed–Off $CO_2$ Amplifier" by R. J. Carbone, IEEE Journal of Quantum Electronics, Jan. 1969.

Primary Examiner—Leon Scott, Jr.
Attorney, Agent, or Firm—Dykema Gossett PLLC

[57] ABSTRACT

A waveguide carbon dioxide ($CO_2$) laser includes a six-sided laser block comprising first and second triangular end sections and a rectangular insert block. The two triangular end sections include a waveguide grid comprising two sets of parallel waveguide channels intersecting at right angles and optically coupled by strip mirrors disposed along the edges of the triangular sections. The rectangular insert block also includes a set of parallel waveguide channels which are congruent with and aligned parallel to the waveguide channels of the two triangular end sections, thereby extending the cavity length of a multiply folded waveguide laser without a corresponding increase in the number of optical folds, the number of folding mirrors, or the value of distributed loss.

17 Claims, 5 Drawing Sheets

EXTENDED MULTIPLY FOLDED OPTICAL PATHS

BACKGROUND OF THE INVENTION

1. Field of the Invention

This invention relates to laser resonators and gas laser systems in which a multiply folded optical path is extended in length with a simultaneous decrease in distributed optical losses, and more particularly, to the use of $CO_2$ gain sections as power amplifiers, and the operation of $CO_2$ lasers as mode-locked oscillators.

2. Background Art

Gas lasers have limited output power capability per unit length. The typical upper limit for a waveguide $CO_2$ laser is of the order of 0.5 W/cm of gain length or, equivalently, 10.0 W/cm$^3$ of excited gas volume. For practical output powers of the order of 50 W, a resonator length of the order of 1.0 m is required, which is a prudent practical upper limit for the physical opto-mechanical length of laser resonators that can be used while providing reliable, stable, and rugged opto-mechanical structures.

When lasers are required with higher output power capability, several techniques have been developed which allow an increase in either laser gain volume or resonator length.

U.S. Pat. No. 4,719,639 (Tulip) and U.S. Pat. No. 4,939,738 (Opower) show techniques which increase the output power of a $CO_2$ laser by increasing the waveguide bore along one dimension to several times its original size, obtaining a slab discharge geometry. To increase the uni-dimensional waveguide size n-times, the output power increases to n-times the output power of the original waveguide laser. The large aspect ratio (ratio of major to minor bore dimensions) of this type of laser cavity requires the use of unstable resonator optics which, in general, produce an asymmetric output beam (in both beam size and divergence), which requires additional external optics, as shown in the Opower patent, to reformat the beam into a symmetric Gaussian profile, as required for practical use, in many applications.

U.S. Pat. Nos. 4,807,232; 4,807,233; 4,807,234; and 5,079,773 (Hart et al.) teach how to increase the output of a waveguide $CO_2$ laser by using a multiplicity of parallel waveguide channels which are separated by incomplete side walls. Energy from each of the waveguide channels leaks into the neighboring channels at the wall gaps, and this interaction causes the output of the individual channels to be phase-locked with respect to each other. The leaky wall represents a loss for each individual waveguide, but this loss is required for the waveguide channel array to operate in a phase-locked mode. Successful operation of the waveguide array depends critically on the degree of coupling between adjacent waveguide channels, which is in turn rigidly determined by the degree of incompleteness of the side wall, and by the separation of the waveguide channels in the array. Increasingly higher output powers can then be achieved either by increasing the length of the waveguide array, or the number of waveguide channels in the array.

U.S. Pat. No. 4,813,052 (DeMaria) shows a similar technique in which the array is achieved by means of adjacent ridges, in either a planar or cylindrical geometry. Again, increased output power can be achieved either by increasing the length of the ridged waveguide, or the number of ridges in the array. For proper mode discrimination and successful phase-locked operation, the separation between adjacent ridges must exceed a minimum value. Since the entire gas volume is electrically excited, but only the region between ridges is optically active, the efficiency of the ridged waveguide (ratio of output optical power to input electrical power) is low, with respect to the efficiency of the equivalent single waveguide channel with complete side walls.

There are a number of applications of $CO_2$ laser technology that require an increase in laser power that can be achieved solely by an increase in resonator length. For these applications, the aforementioned techniques based on transverse scaling or multiple bore arrays are not applicable. Two typical examples are the use of $CO_2$ gain sections as power amplifiers, and the operation of $CO_2$ lasers as mode-locked oscillators.

R. J. Carbone, in "Characteristics of a Single-Frequency Sealed-Off $CO_2$ Amplifier", IEEE Journal of Quantum Electronics, Vol. QE-5, Pages 48–49, January 1969, uses a large bore, low pressure $CO_2$ gain tube comprising three parallel 3-meter sections linearly coupled by suitable fold mirrors to amplify low power $CO_2$ radiation. With 1.0 W of input power, the 9-meter structure produces a total of 95 W in sealed-off mode, and 110 W in a flowing gas mode of operation.

Similarly, M. B. Klein and R. L. Abrams, in "10.6-µm Waveguide Laser Power Amplifiers", IEEE Journal of Quantum Electronics, Vol. QE-11, No. 8, August 1995, describe the use of a DC-excited waveguide structure with flowing gas, for the amplification of the output of low power $CO_2$ radiation. Starting with an input power of 1.0 W, they determined that the amplifier lengths required to obtain the target output powers of 100 and 200W were 5.0 and 9.0 m, respectively. If the amplifier were required to operate in a sealed-off mode with no gas flow, the required amplifier length would increase considerably, due to the lower small signal gain coefficient in this mode of operation.

In mode-locked operation, periodic cavity losses are introduced in the laser cavity, usually by means of intra-cavity modulators. If the loss-producing waveform has a period which matches the photon round trip time of the resonator cavity, the output is mode-locked and comprises a train of narrow pulses separated by a time interval equal to the cavity round trip time. One of the most useful applications of this type of laser waveform is for Range-Doppler Imaging (RDI) laser radar (LADAR) systems. In these systems, targets can be resolved in range (i.e., size) and frequency (i.e., spectral characteristics due to rotation and precession) by analyzing, in a time-gated receiver, the radiation such targets reflect when illuminated by a laser beam. For unambiguous results, only one laser pulse at a time must illuminate the target. Extended targets several meters in length require a mode-locked waveform with long pulse periods, which can only be produced by laser resonators with long cavity lengths. Since the prevailing use of these mode-locked laser systems is for either tactical or strategic military applications, the opto-mechanical structure of long cavity length resonators must be further reduced in order to perform satisfactorily under severe environmental conditions and stressful deployment modes.

U.S. Pat. Nos. 4,429,398, and 4,438,514 (Chenausky et al.) show techniques to increase the length of waveguide $CO_2$ lasers by either using two parallel waveguide channels which are U-folded, or three waveguide channels which are Z-folded by means of intra-cavity folding optics. For a given resonator length, these techniques produce a two or three-fold decrease in longitudinal dimensions with a moderate increase in lateral dimensions.

U.S. Pat. No. 4,815,094 (Cantoni) and U.S. Pat. No. 4,870,654 (Cantoni et al.) demonstrate that a large reduction of the resonators longitudinal dimension can be achieved by multiple intra-cavity folding techniques, wherein the intra-cavity laser paths intersect. Increasingly longer resonator lengths can then be achieved by increasing the separation between waveguide channels for a given number of intra-cavity optical folds, or by increasing the number of folds for a given separation between waveguide channels. Conversely, smaller structures can be achieved for a given resonator length, by decreasing the separation between waveguide channels while, at the same time, increasing the number of intra-cavity optical folds. The first technique results in larger opto-mechanical structures, which may not be acceptable in some applications. The second technique leads to an increase in intracavity losses, which results in a smaller increase in laser output power than would be predicted by the linear increase in cavity length. The complete text of both of these patents are hereby incorporated by reference into this specification.

SUMMARY OF THE INVENTION

It is the primary object of this invention to increase the optical length of a multiply folded laser, as described in U.S. Pat. No. 4,815,094, (Cantoni) and U.S. Pat. No. 4,870,654 (Cantoni et al.) without a corresponding increase in intracavity optical losses. This increase in optical length is achieved by the use of a ceramic block of suitable length in which a number of parallel waveguide channels are ground. The number of parallel waveguide channels and the spacing between such channels is selected to be equal to the number of parallel waveguide channels in a multiply folded laser block. The separation between such channels is selected to be equal to the separation between parallel waveguide channels in a multiply folded laser block. The multiply folded laser block is split along a suitable symmetry plane, and the two resulting triangular half-blocks are separated by a distance equal to the length of the laser block in which the parallel waveguide channels are ground. This insert block is sandwiched between the two triangular multiply folded laser half-blocks in such a way as to position such parallel waveguide channels along the optical axes connecting the set of parallel waveguide channel segments in the left-hand-side triangular multiply folded laser half-block with the set of parallel waveguide channel segments in the right-hand-side triangular multiply folded laser half-block. By this technique, the original multiply folded laser cavity length is increased by "n" times the length of the insert block disposed between the two multiply folded laser half-blocks, where "n" is the number of parallel channels in the insert block.

A second object of this invention is to increase the optical length of a multiply folded laser by extending the cavity length in two dimensions.

A third object of this invention is to produce a series of extended multiply folded lasers of increased cavity length without the need for a corresponding series of folding mirrors of different size.

A fourth object of this invention is to demonstrate how a modular set of insert blocks can be used in a suitable combination to produce a series of extended multiply folded lasers of increased cavity length, and therefore increased output power.

A fifth object of this invention is to demonstrate how extended multiply folded lasers of increased cavity length can be used as either single-pass or double-pass power amplifiers.

A sixth object of this invention is to demonstrate how extended multiply folded lasers of increased cavity length can be modified to include an integral but optically independent waveguide channel to be used as a local oscillator in heterodyned systems.

The principles of this inventions are preferably incorporated in a waveguide $CO_2$ laser system having a six-sided laser block. The six-sided block comprises a rectangular insert block with parallel waveguide channels, and two triangular multiply folded laser half-blocks with an orthogonal grid of waveguide channel, one on each side of the insert block. Two fold mirrors are located along the sides of each triangular multiply folded laser half-block and couple optical radiation from each waveguide segment into the next orthogonal waveguide segment. The active resonator can be used as either a laser oscillator or a power amplifier, and in either continuous wave or pulsed mode.

For a more complete understanding of the present invention, reference is made to the following detailed description and accompanying drawings in which the presently preferred embodiments of the invention are shown by way of example. As the invention may be involved in numerous forms without departing from the spirit or essential characteristics thereof, it is expressly understood that the drawings are for purposes of illustration and description only, and are not intended as a definition of the limits of the invention. Throughout the description and drawings, like reference numbers refer to the same component throughout the several views.

DETAILED DESCRIPTION OF THE INVENTION

Multiply folded laser geometries are best described in matrix notation. In a "closed-loop" configuration, the partial reflector and the total reflector are located at the same node (see FIG. 9), whereas, in an "open-loop" configuration, a partial reflector is located at one node and the total reflector is located at a different node (see FIG. 1 ). If "a" is the size of the separation between optical reflections along the fold mirrors (grid units) then the symbol M(i, j) describes a multiply folded laser with "i" grid units along the x-axis of the block, and "j" grid units along the y-axis of the block. The total cavity length "L" for a multiply folded laser is:

$$L=2(2)^{1/2}aij$$

for open-loop structures, the number of optical reflections "$N_r$" and channel crossings "$N_c$" is given by:

$$N_r=2(i+j-1)$$

$$N_c=(2i=1)(2j-1)/2$$

For closed-loop structures:

$$N_r=2(i+j)$$

$$N_c=i(j-1)+j(i-1)$$

Figure 1:
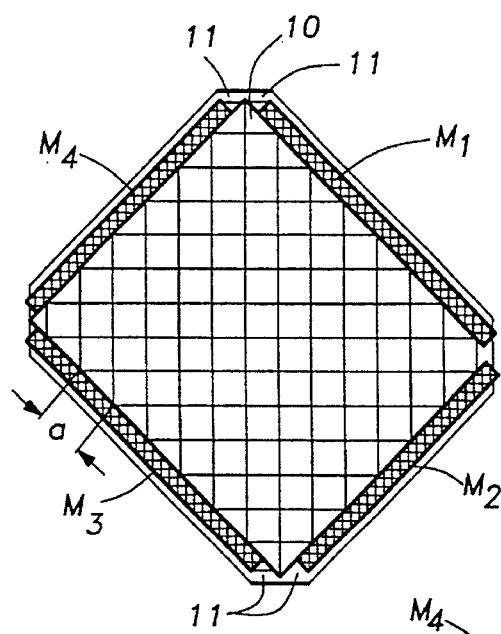
FIG. 1 is a planar view of an M(6.5, 7.5) multiply folded laser block.

FIG. 1 depicts an open-loop, M(6.5, 7.5) multiply folded laser wherein a=2.0 cm, wherein L, $N_r$, and $N_c$ are calculated to be:

$$L=276 \text{ cm}$$

$$N_r=26$$

$$N_c=84$$

The multiply folded laser physically comprises a laser block [10] of size X=13 cm and Y=15 cm. Integral ledges [11] extend along the x- and y-sides, on which fold mirrors "$M_1$", "$M_2$", "$M_3$", and "$M_4$" are integrally mounted. For clarity, the waveguide channels have been omitted and replaced with lines corresponding to their optical axes. For alignment purposes, gaps (not shown) are introduced between the laser block and the fold mirrors at each optical fold, creating additional losses. The number of gaps "$N_g$" is equal to the number of reflections "$N_r$". The losses produced by the crossings "$I_c$", the reflections at the fold mirrors "$I_r$", and the gaps "$I_g$", are measured to be:

$$I_c=0.07\%$$

$$I_r=0.25\%$$

$$I_g=0.14\%$$

Using these values, a total single pass loss of 16% is calculated for the M(6.5, 7.5) multiply folded laser in this example, in good agreement with a measured single pass loss of 18%, corresponding to a distributed loss of $5.8\times10^{-4}$ $cm^{-1}$ and $6.5\times10^{-4}$ $cm^{-1}$, respectively. Using these values of distributed loss and typical values for small signal gain coefficient "$g_o$" of $5.0\times10^{-3}$ $cm^{-1}$ and for saturation power, "$P_s$", of 85 W, an output power of 88 W is calculated from the multiply folded laser, in good agreement with a maximum measured power of 94 W actually achieved.

Figure 2:
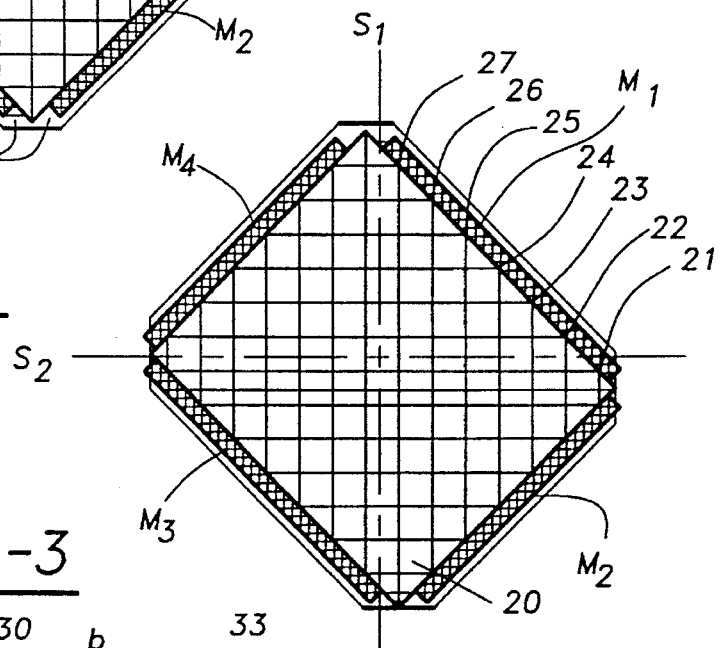
FIG. 2 is a planar view of the M(6.5, 7.5) multiply folded laser block of FIG. 1, with "$S_1$" designating the intersection of a symmetry plane with the laser block, and "$S_2$" designating the intersection of a non-symmetry plane with the laser block.

FIG. 2 discloses the M(6.5, 7.5) multiply folded laser of FIG. 1 with line "$S_1$" designates the intersection of a first plane normal to the laser block [20]. "$S_1$" is defined as a "symmetry plane", since all optical folds on the fold mirrors fall either to the right or the left of "$S_1$". "$S_2$" designates the intersection of a second plane which is normal to "$S_1$" and normal to the laser block [20]. "$S_2$" is not a symmetry plane, since optical fold [21] falls to one side of "$S_2$" of fold mirror "$M_1$" and optical folds [22], [23], [24], [25], [26], and [27] fall on the other side of "$S_2$".

Figure 3:
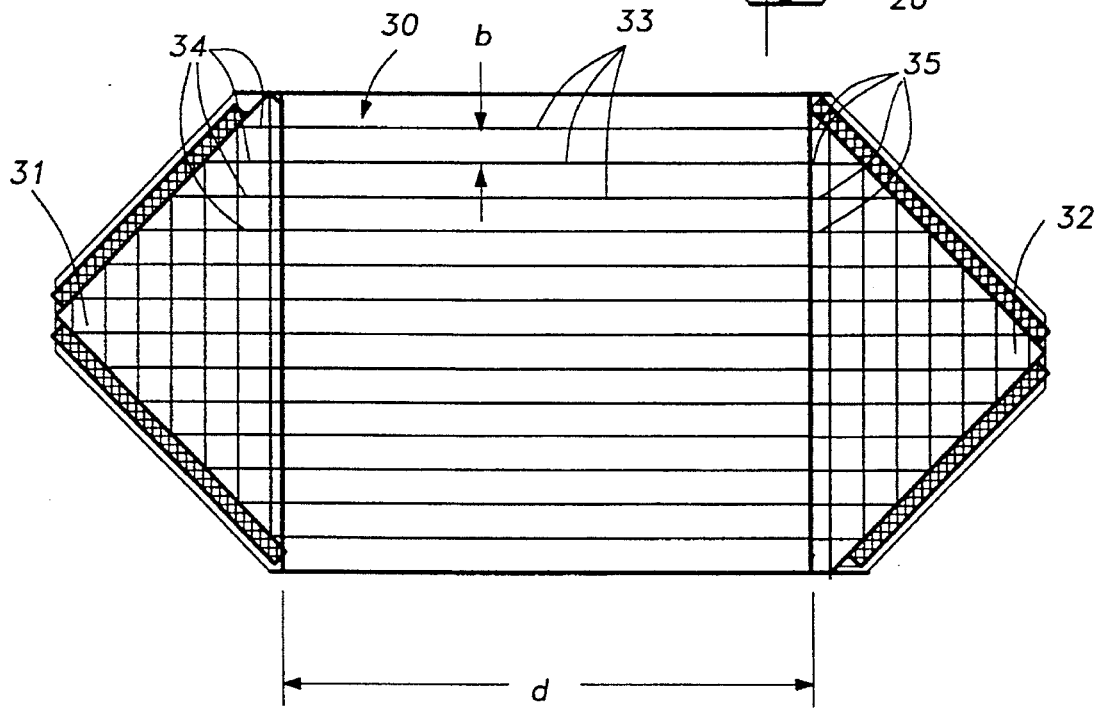
FIG. 3 is a planar view of an extended multiply folded laser block obtained by splitting the M(6.5, 7.5) laser block of FIG. 1, and sandwiching the half-blocks about a rectangular insert block having thirteen parallel waveguide channels.

FIG. 3 includes a rectangular insert block [30] of length "d" in which "n" parallel waveguide channels [33] are ground. For clarity, the waveguide channels have been omitted and replaced by lines corresponding to the central axes of the waveguide channels. The number "n" is selected to satisfy the formula:

$$n=i+j-k$$

with k=1 if the value of "i+j" is an integer (such as 2, 3, . . . ), and k=0.5 if the value of "i+j" is a half-integer (such as 2.5, 3.5, . . . ).

The spacing, "b", between the parallel waveguides is selected to be equal to the spacing between the horizontal waveguide channels in the multiply folded laser block, and obeys the relationship:

$$a=2^{1/2}b$$

The M(6.5, 7.5) multiply folded laser block is split along "$S_1$", with the two multiply folded laser half-blocks [31] and [32] separated by a distance "d", which is equal to the length of the rectangular insert block [30]. The insert block [30] is positioned between the two multiply folded laser half-blocks [31] and [32] such that parallel waveguide channels [33] of such half-blocks are aligned along the optical axes connecting the horizontal waveguide channel segments [34] in multiply folded laser half-block [31] to the horizontal waveguide channel segments [35] in multiply folded laser half block [32]. The laser half-blocks [31] and [32] and the insert block [30] are preferably made from a ceramic material. The ceramic material may be either alumina ($Al_2O_3$) or beryllia (BeO), the alumina being preferred because of cost considerations.

By this technique the cavity length of the M(6.5, 7.5) multiply folded laser has been increased by an amount equal to the product "n" and "d", without a corresponding increase in the number of optical elements (number of fold mirrors), or the value of intracavity losses (number of optical folds). The new cavity length is:

$$L=2(2)^{1/2}aij+(i+j-k)d$$

with the value of "k" depending upon the value of the sum "i+j".

Figure 4:
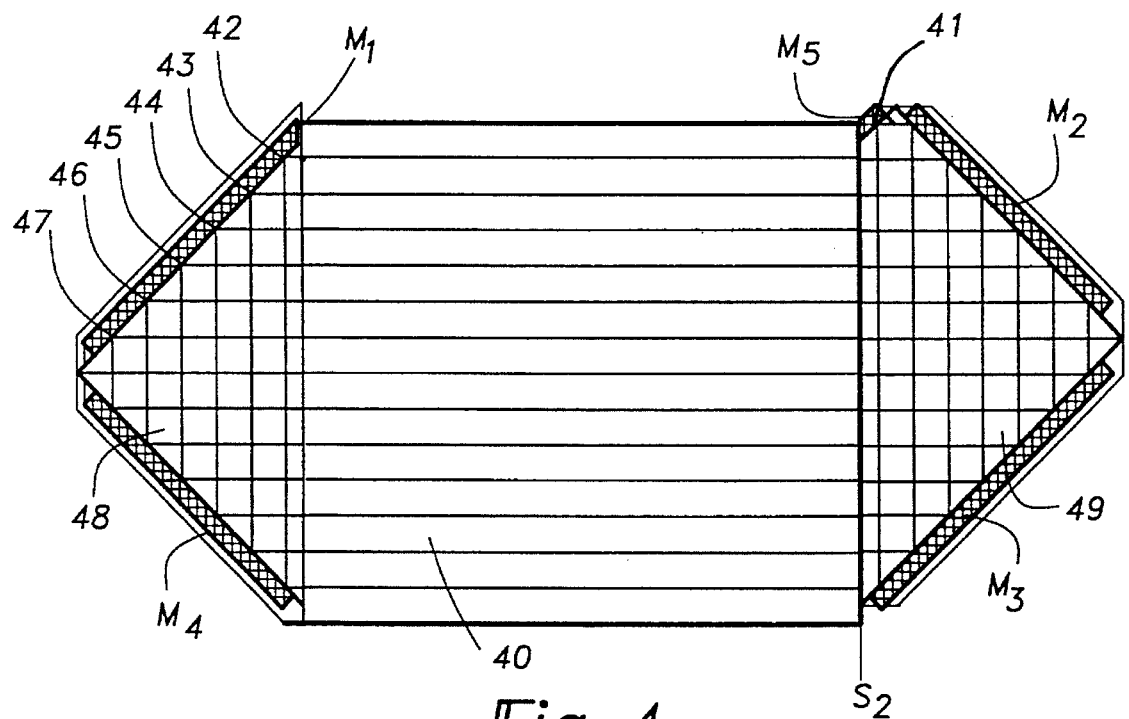
FIG. 4 is a planar view of an extended multiply folded laser block obtained by sandwiching the M(6.5, 7.5) multiply folded laser block of FIG. 1 split along line "$S_2$" about the rectangular insert block of FIG. 3A.

FIG. 4 discloses an M(6.5, 7.5) multiply folded laser block [40] cut along "$S_2$" and similarly extended in cavity length. Although this process also extends the cavity length of the original multiply folded laser by the same amount, optical fold [41] has been separated from other optical folds [42], [43], [44], [45], [46], and [47] on fold mirror "$M_1$", which now requires an additional fold mirror "$M_5$" to complete the optical path. Hence, the extension of the M(6.5, 7.5) multiply folded laser cavity about non-symmetry planes, while feasible, has reduced utility with respect to the extension of such laser cavity about symmetry planes.

It is sometimes desirable to reduce the size of the laser to satisfy system requirements and the constraints on linear dimensions and volume. For multiply folded lasers of the type M(i, j) and grid dimension "a", the area "A" of the laser block is:

$$A = a^2 ij$$

This value can be reduced by decreasing the spacing between waveguide channels, i.e., the value of the grid dimension "a". However, if the original cavity length is to be preserved, it is seen from the expression:

$$L = 2(2)^{1/2} aij$$

that the product of "i" and "j" must increase by the same amount to preserve the desired cavity length. This increase in the product of "i" and "j" results in an increase in the number of optical reflections "$N_r$", the number of crossings "$N_c$", and the number of gaps "$N_g$", resulting in an increase in overall optical loss.

As an example, consider an M(6.5, 7.5) multiply folded laser having a grid dimension, a=2.0 cm. The area of the laser block, the cavity length, and the total optical loss are:

$$A = 195 \text{ cm}^2$$

$$L = 276 \text{ cm}$$

$$l = 16\%$$

If the surface area is halved by changing the grid dimension to a=1.0 cm, an M(9.5, 10.5) multiply folded laser of reduced area but of equal cavity length yields:

$$A = 99.8 \text{ cm}^2$$

$$L = 282 \text{ cm}$$

$$l = 27.4\%$$

The reduced multiply folded laser has approximately half the area, and the same cavity length (the slight differences being the result of "i" and "j" being half integers). However, the single pass loss has increased dramatically by seventy-one (71) percent.

Conversely, consider an extended multiply folded laser built accordingly to the principles of this invention, with an original surface area equal to that of the original multiply folded laser before area reduction. The cavity length is:

$$L = 2(2)^{1/2} aij + (i+j-1)d$$

For an M(5.5, 6.5) multiply folded laser having a grid dimension a=1.0 cm, and separated by a distance of d=15.8 cm, the following values for the area of the laser block, the cavity length, and the total optical loss are:

$$A = 209 \text{ cm}^2$$

$$L = 275 \text{ cm}$$

$$l = 9\%$$

These are about the same as the values for the original multiply folded laser before area reduction. The lower value for the optical loss is the result of a decrease in the number of reflections, crossings and gaps, and lower values for the "i" and "j" indexes.

If the area of the extended multiply folded laser is reduced by choosing a lower value for the grid dimension a=0.5 cm, the value of "d" in the expression for the cavity length of the extended multiply folded laser is increased while keeping "i" and "j" constant, the following values of an M(5.5, 6.5) extended multiply folded laser parameters are obtained:

$$d = 20.4 \text{ cm}$$

$$L = 275 \text{ cm}$$

$$A = 105 \text{ cm}^2$$

$$l = 9\%$$

Hence, the area reduction achieved by a denser packing of the waveguide channels results in no additional loss, since the number of reflections, crossings, and gaps is determined by the selected values for "i" and "j", which have not changed. The only increase is in the length of the rectangular block inserted between the two triangular multiply folded laser half-blocks, which causes no additional optical loss.

Once the values of "i" and "j" have been selected for an extended multiply folded laser geometry, the length of the extended multiply folded laser is uneffected by changes of the grid dimension "a", while the width of the extended multiply folded laser structure is linearly proportional to "a". Thus, the area and the form factor of a laser built using the extended multiply folded laser techniques disclosed in this invention can be tailored to suit specific requirements of size and volume, with no adverse impact on the optical resonator losses, and laser performance. The only limitation to area reduction is the need to provide sufficient cooling surface to remove the heat generated by the electrical discharge in the waveguide channels of the laser resonator.

Figure 5A:
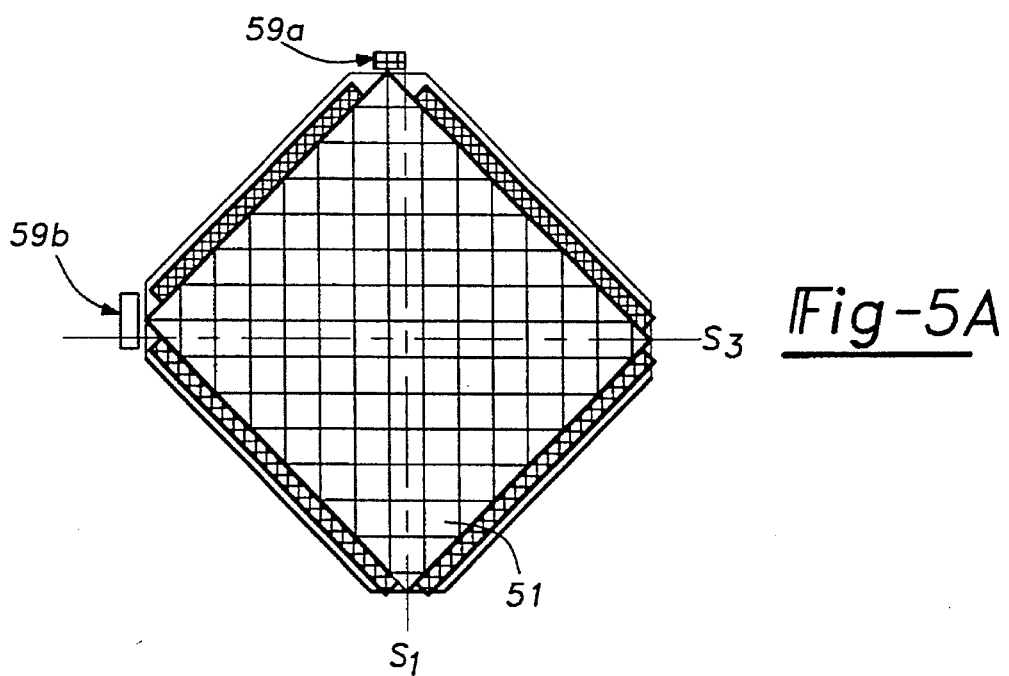
FIG. 5A is a planar view of an M(7, 7.5) multiply folded laser block designating the intersection of two symmetry planes ("S1" and "$S_3$") normal to the laser block.
Figure 5B:
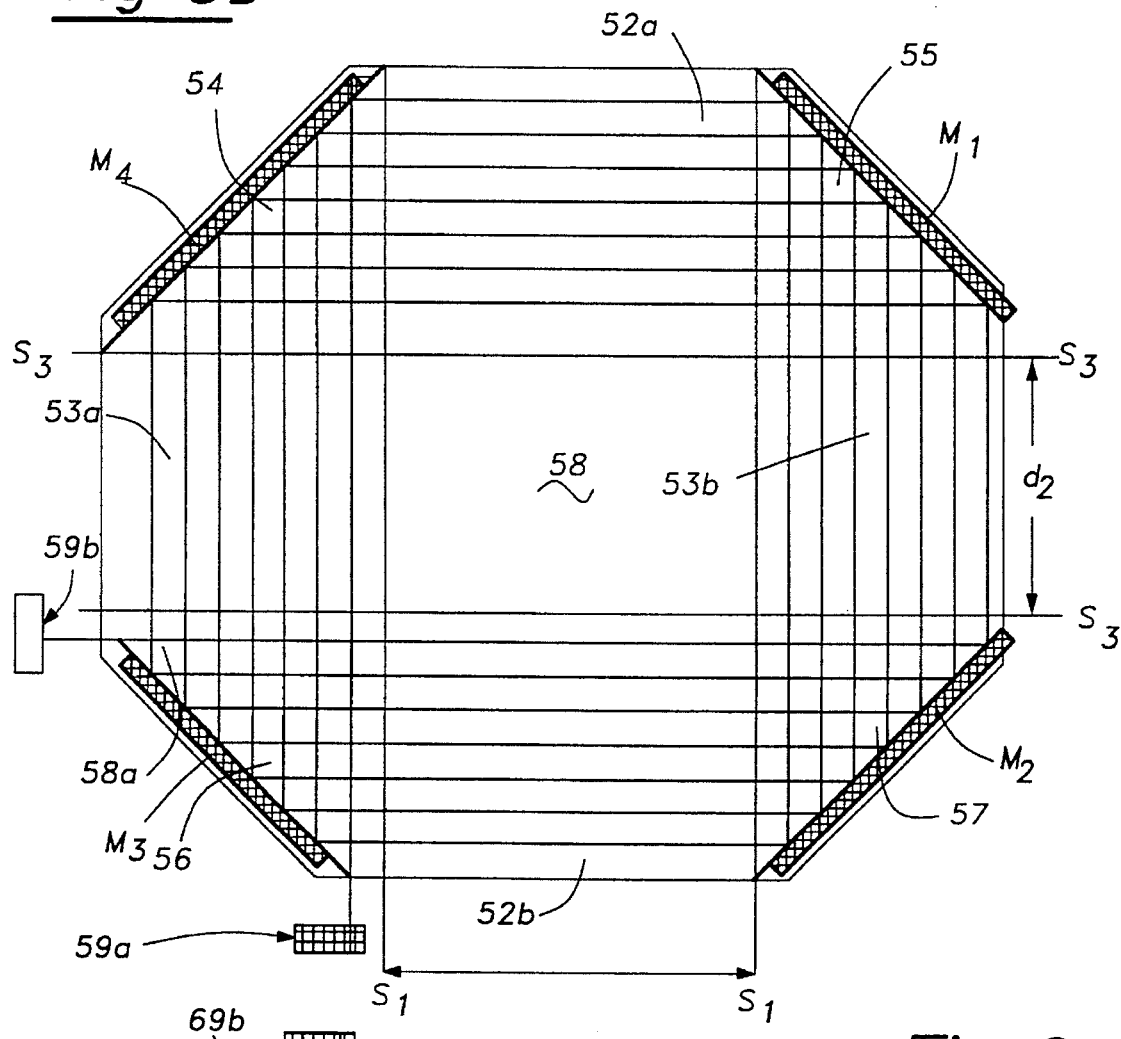
FIG. 5B is a planar view of the extended multiply folded laser block obtained by combining four rectangular insert blocks with the M(7, 7.5) multiply folded laser of FIG. 5A.

FIG. 5A discloses an M(7, 7.5) multiply folded laser block [51], having a total reflector [59a] and an output coupler [59b]. Two intersecting orthogonal symmetry planes, indicated by "$S_1$" and "S3", designate the intersection of two orthogonal symmetry planes with laser block [31]. The cavity length of the M(7, 7.5) multiply folded laser may be extended by cutting the block [51] along either "$S_1$" or "S3" and inserting a rectangular insert block with either horizontal or vertical parallel waveguide channels. In addition, the cavity length of the original multiply folded laser block may be extended in both dimensions, by cutting the laser block [51] along both "$S_1$" and "$S_3$", and by inserting a first pair of rectangular insert blocks, [52a and 52b] of width "$d_3$", and a second pair of rectangular insert blocks [52a and 52b] of width "$d_4$", each pair with horizontal and vertical parallel waveguide channels between the four multiply folded laser quarter blocks [54], [55], [56], and 57] (see FIG. 5B). While the resulting structure presents a central area [58] which is not covered by waveguide sections and is, therefore, a less efficient method of area coverage, this technique may still be useful when space limitations prohibit one-dimensional cavity extensions past a fixed upper limit. The two block pairs [52a and 52b] and [53a and 53b] need not be of equal lengths. Also, a single cross-shaped insert block (not shown) may be used, instead of the four insert rectangular blocks [52a and 52b] and [53a and 53b].

Figure 6:
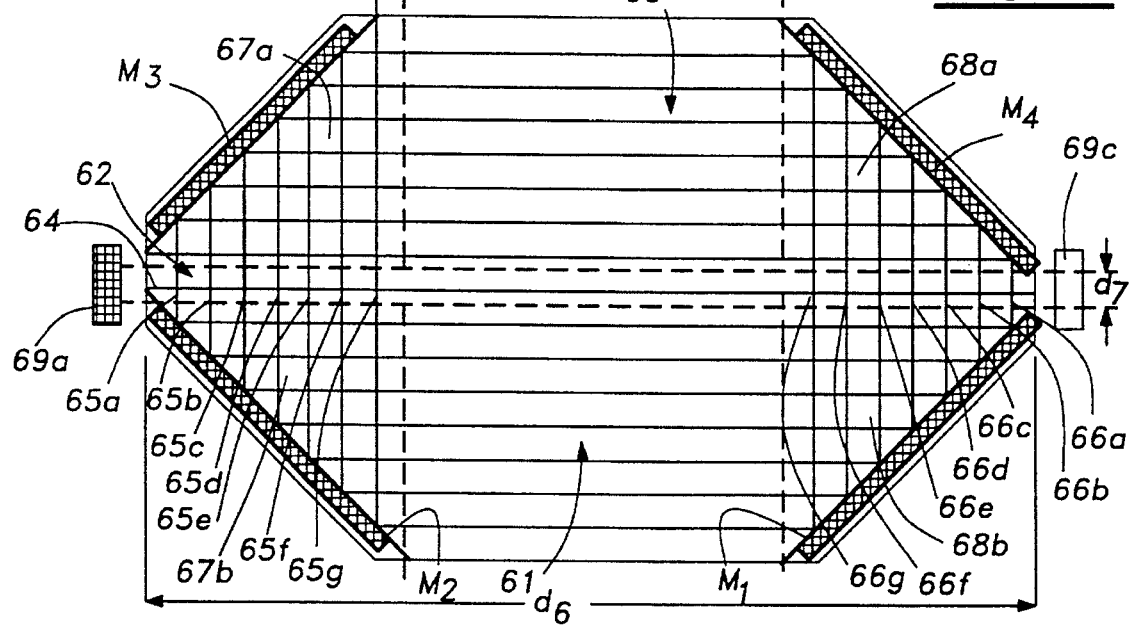
FIG. 6 is a planar view of an extended multiply folded laser block in which an integral local oscillator is combined with an insert block.

FIG. 6 shows a multiply folded laser extended in one dimension by the addition of a pair of insert blocks [60] and [61] of sufficient length "$d_5$" to achieve the desired cavity length extension, and extended in the orthogonal direction by the addition of an insert block [62]. The extended multiply folded laser includes a total reflector [69a] and output coupler [69b and 69c]. Insert block [62] has a length "$d_6$" equal to the length to the extended multiply folded laser block, and having a width "$d_7$" equal to the waveguide channels separation "b". Insert block [62] carries a long waveguide channel [64], and a set of short orthogonal waveguide channels [65a, 65b, 65c, 65d, 65e, 65f, and 65g], and [66a, 66b, 66c, 66d, 66e, 66f, and 66g], which connect the vertical waveguide channel segments in the multiply folded laser quarter blocks [67a] and [68a] to the vertical waveguide channel segments in the multiply folded laser quarter blocks [67b] and [68b], respectively. By this technique an extended multiply folded laser block with an integral but optically independent waveguide channel is obtained. This additional waveguide channel can be used, in conjunction with a suitable pair of resonator optics, to produce independent optical radiation with respect to the extended multiply folded laser resonator. The output of this independent waveguide channel can be used as an integral local oscillator in applications when the extended multiply folded laser is used as a transmitter in a coherent transceiver system. This technique eliminates the need for a physically distinct laser resonator, which would require a separate vacuum envelope, power supply, and cooling system. In addition, since the transmitter and local oscillator are housed in the same vacuum envelope and share the same power supply and cooling system, the resulting opto-mechanical structure offers increased ruggedness and stability with respect to the corresponding transceiver system which requires two physically distinct resonators.

Figure 7:
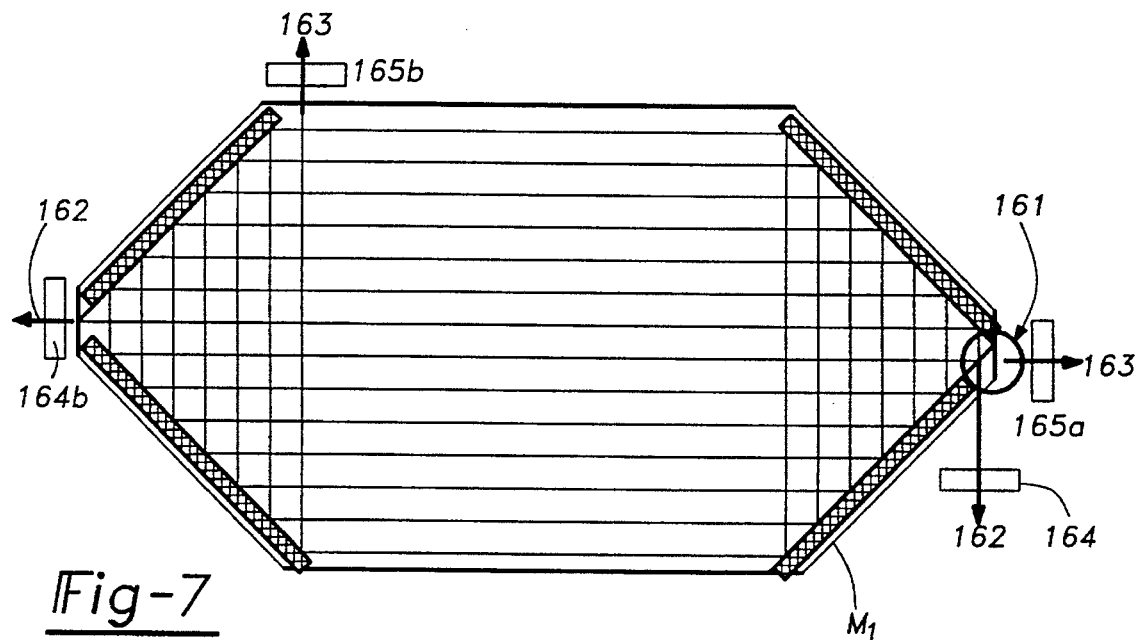
FIG. 7 is a planar view of an extended multiply folded laser block in which an integral local oscillator is obtained by reducing the length of one of the folded mirrors.

Alternatively, an optically independent waveguide channel, for use as an integral local oscillator can be obtained by the technique shown in FIG. 7. Here, fold mirror "$M_1$" has been shortened to eliminate optical fold [161]. In this fashion, folded optical path [162] becomes independent of the multiply folded optical path [163] and can be used as an optical path for an independent local oscillator. The extended multiply folded laser includes total reflector [165a] and output couplers [164b and 165b].

Figure 8A:
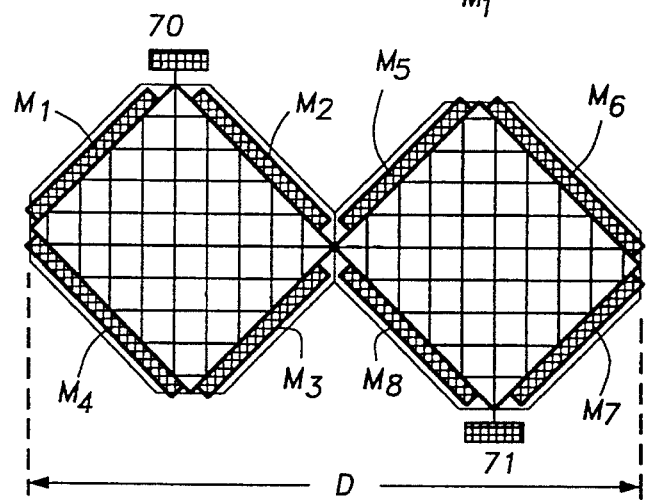
FIG. 8A is a planar view of a linear stack of two multiply folded laser blocks in which two M(4.5, 5) multiply folded laser blocks are stacked end-to-end to increase the length of the laser cavity.
Figure 8B:
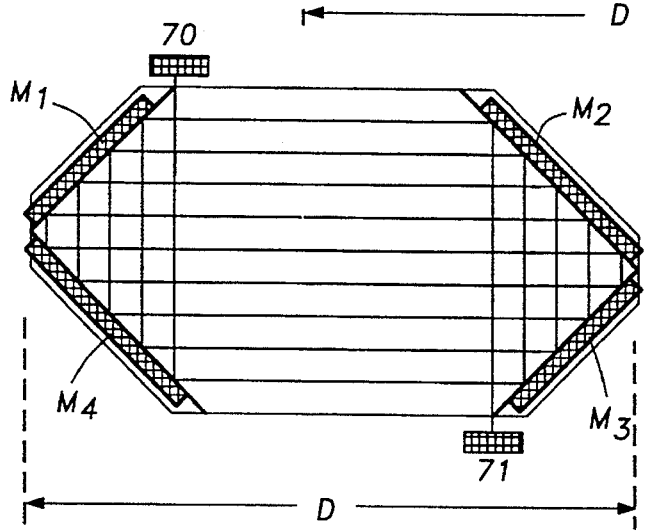
FIG. 8B is a planar view of the extended multiply folded laser block of cavity length equal to the linear stack of the two M(4.5, 5) multiply folded laser blocks shown in FIG. 7A for comparison.

A plurality of multiply folded laser blocks can be used to achieve longer cavity lengths by side-by-side linear stacking. FIG. 8A shows such a possibility, in which two M(4.5, 5) multiply folded laser blocks are stacked end-to-end to double the cavity length, including total reflector [70] and output coupler [71]. FIG. 8B, shows a comparable extended multiply folded laser block of the same physical length "D", having a cavity length that has been doubled by the techniques disclosed in this invention. Comparison of the two techniques shows the following:

1. The extended multiply folded laser in FIG. 8B has the same length and width as the two stacked multiply folded lasers in FIG. 8A. While the total block area of the extended multiply folded laser in FIG. 8B is greater by 50% than the total block area in FIG. 8A, both structures require a vacuum enclosure of equal size to be operated as a laser.

2. With respect to the stacked multiply folded lasers in FIG. 8A, the extended multiply folded laser in FIG. 8B has eliminated fold mirrors "$M_5$", "$M_6$", "$M_7$" and "$M_8$" required in the stacked multiply folded lasers in FIG. 8A. This results in a fifty (50) percent decrease in the number of folding mirrors and associated costs, which more than offsets the slight increase in ceramic cost of the extended multiply folded laser. This also results in a halving of the number of alignment procedures required by the stacked multiply folded lasers in FIG. 8A. The decrease in the number of optical elements also reduces the possibility of misalignment in operation and increases the ruggedness and durability of the structure.

Figure 9:
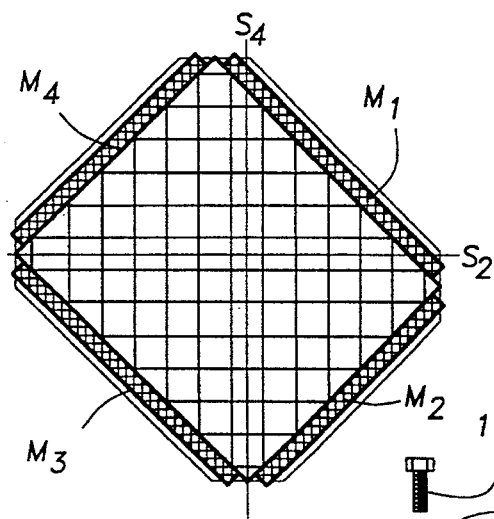
FIG. 9 is a planar view of a closed-loop M(6, 7) multiply folded laser block with "$S_2$" and "$S_4$" designating the intersection of two non-symmetry planes with the laser block.

3. The elimination of the four fold mirrors in the stacked multiply folded laser configuration of FIG. 8B results in a decrease in the optical losses due to reflections, crossings, and gaps by a factor of two. Doubling the cavity length without a corresponding increase in single pass loss results in better output power capability per unit length. In the example cited above, the M(6.5, 7.5) multiply folded laser, with an output power of 94 W and a total cavity length of 276 cm, produces an output power of 34 W/m. Doubling the cavity length by end-to-end stacking of two multiply folded lasers of this type still produces 34 W/m, with a total power of 188 W. The extended multiply folded laser of FIG. 8B yields a two-fold reduction in distributed loss, and total output power of 250 W, or an equivalent of 45 W/m, a 33% increase. FIG. 9 shows an M(6, 7) closed-loop multiply folded laser block. For this type of multiply folded laser structure, there are no symmetry planes (see "$S_2$" and "$S_4$"), and therefore closed-loop multiply folded laser structures are not good candidates for cavity length extensions by the techniques disclosed in this invention.

For the best practical implementation of the principles of this invention, the extended multiply folded laser waveguide grid structure is ground in a single, six-sided laser block comprising a central rectangular portion with a parallel set of waveguide channels. Two triangular sections disposed at either end of the central rectangular portion, each carry half of the orthogonal waveguide channel grid corresponding to the multiply folded laser block with the optical length being extended. Ledges extending along the sides of the two triangular sections are used to attach the fold mirrors of the original multiply folded laser to form the optical cavity length.

The application for which the extended multiply folded laser is to be used may change to one requiring longer cavity lengths, either for the purpose of achieving higher output power or amplification, or to lengthen mode-locked pulse periods. This may be achieved by selecting an extended multiply folded laser block with a longer insert block. Hence, it is not necessary to change the size of the fold mirrors, as would be needed for a standard multiply folded laser structure.

Conversely, for applications in which more than one laser model must be offered, each with a different output power capability for different customer applications, the principles of this invention enable a modular approach to achieve the various power requirements. For example, assume that three different laser models must be offered with cavity lengths of 1.0 m, 2.0 m, and 3.0 m. The best implementation of the principles of the present invention will use the following set of modular components:

1. Two separate triangular blocks, the first corresponding to the left-hand side multiply folded laser half block and the second corresponding to the right-hand side multiply folded laser half block. When positioned side-by-side, the combination is a standard multiply folded laser block having an optical cavity length of 1.0 m. An M(4.5, 5) block with a grid dimension a=1.57 cm may be used.

2. A rectangular insert block of length "d", with a set of "n" parallel waveguide channels is needed, such that the total waveguide channel length (the product of "d" and "n") is equal to 1.0 m. When positioned between the two triangular multiply folded laser half blocks, the total length of the waveguide channels in the three-piece assembly is 2.0 m. A rectangular insert block may be used that is 11.1 cm long with nine parallel waveguide channels each having a 1.11 cm spacing.

3. A rectangular insert block of length "2d", with a set of "n" parallel waveguide channels is needed, such that the total waveguide channel length, "2dn", is 2.0 m. When positioned between the two triangular multiply folded laser half blocks, the total length of the waveguide channels in the three-piece assembly is 3.0 m. A rectangular block 22.2 cm in length, with nine parallel waveguide channels each having a 1.11 cm spacing may be used. Alternatively, two rectangular insert blocks 11.1 cm long may be used.

By this technique, a supplier can stock a number of standard optical components (fold mirrors) and blocks (either triangular end pieces or rectangular insert blocks), thereby reducing manufacturing costs. In addition, triangular end sections can be prefabricated with fold mirrors attached, stocked as finished sub-assemblies, and the sub-assemblies used interchangeably depending upon the specific customer requirements, thereby streamlining manufacturing.

Figure 11:
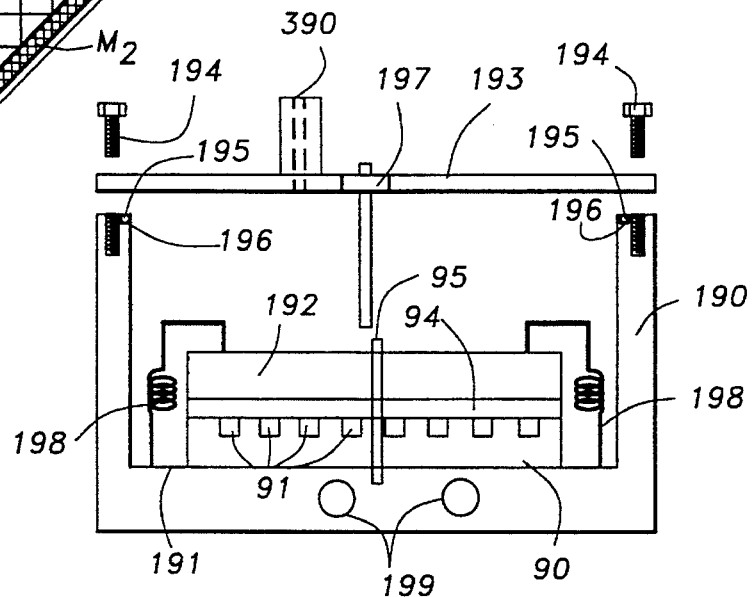
FIG. 11 is a cross-sectional view taken along "11—11" of the practical laser resonator of FIG. 10.
Figure 10:
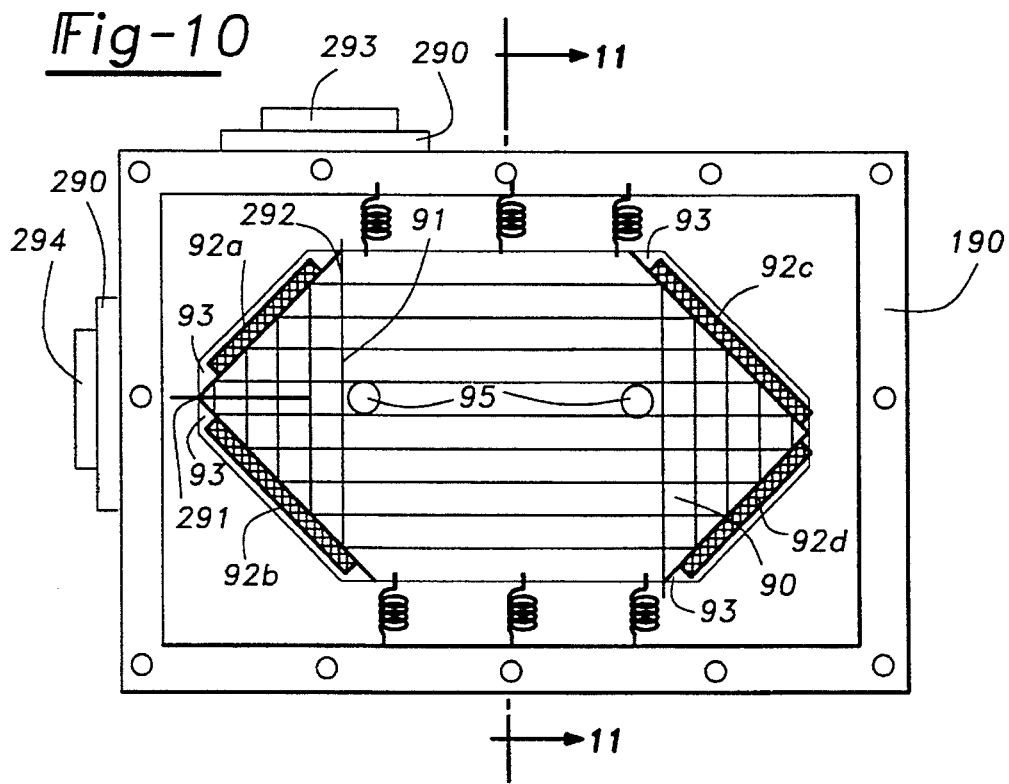
FIG. 10 is a planar view of an M(4, 4.5) practical laser resonator incorporating an extended multiply folded laser block.

FIG. 10 discloses a plan view of a laser constructed using the principles described in this invention, and FIG. 11 shows a cross-section along "11-11" of the laser device in FIG. 10. A six-sided laser block [90] is shown with a grid of waveguide channels [91], which are ground in the block of an M(4, 4.5) extended multiply folded laser pattern. Fold mirrors [92a, 92b, 92c, and 92d] are permanently attached to mirror ledges [93] integral to the laser block [90], and optically connect waveguide channels in a traditional multiply folded laser geometry. Plate [94] of dimensions equal to the laser block [90] is disposed on top of the laser block [90] and located by pins [95] to provide all-dielectric boundaries to the optical radiation in the waveguide channels. Plate [94], laser block [90], and pins [95] are preferably made of a ceramic material. Metal box [190], preferably constructed of aluminum or stainless steel, is used as a vacuum envelop necessary for laser operation. The bottom surface [191] of box [190] supports the stack comprising the laser block [90] and plate [94], which are secured to the bottom surface by means of pins [95]. Metal plate [192] is located on top of the stack, comprising the laser block [90] and the block [94], by means of the pins [95], and acts as a hot electrode as required to produce the electrical discharge in the waveguide channels necessary to produce and sustain laser oscillation. Metal plate [193] is located on top of metal box [190] and is bolted to box [190] by fasteners [194]. O-ring [195] located in groove [196] machined on the top surface of the side walls of box [190], is compressed by the fastening of the metal plate [193] and ensures that the structure has proper vacuum integrity. An electrical feedthrough [197] is located in the metal plate [193], and carries electrical energy to the electrode [192].

In the preferred embodiment, the electrical discharge is powered by an RF generator operating at a frequency which, for optimum power extraction is:

$$fd=280$$

where "f" is the RF generator frequency in MHz, and "d" is the waveguide channel dimension in mm, so that for a typical waveguide channel of 2.0 mm, the proper RF generator frequency is 140 MHz. For proper operation, inductors are used to offset the capacitive reactance of the stack at the drive frequency. In addition, multiple inductors are used to reduce voltage fluctuations along the RF electrode. Therefore, inductors [198] are connected between RF electrode [192] and the bottom surface [191] of metal box [190], in numbers and at locations sufficient and appropriate to, at the same time, form parallel resonance of the stack to the RF generator frequency and obtain adequate voltage uniformity along the RF electrode.

Optical mounts [290] are located on the side walls of metal box [190], in close correspondence to end channels [291] and [292]. For operation as a laser oscillator, a total reflector [293] and an output coupler [294] are located in optical mounts [290]. In the preferred embodiment of a waveguide $CO_2$ laser, the total reflector is preferably made of silicon with a dielectrically enhanced high reflective coating. The output coupler is preferably made of zinc selenide, with an anti-reflection coating on the surface facing away from the laser cavity, and a reflective coating on the surface facing toward the laser cavity, the reflectivity depending upon the physical length of the laser resonator (for a 6-meter expanded multiply folded waveguide laser, the optimum reflectivity is computed to be about 30%). The total reflector and output coupler location can be interchanged depending on which output configuration is desired for a given application. For operation as an amplifier, total reflector [293] and output coupler [294] are replaced by transparent windows in the same location, to allow input of optical radiation into the amplifier from a separate oscillator on one end, and power extraction from the amplifier at the other end. In the preferred embodiment, the windows are made from zinc selenide, with anti-reflection coatings on all surfaces.

The bottom plate of metal box [190] is used to remove heat from the stack caused by the RF discharge. For this purpose, channels [199] are machined in the bottom plate and are used to circulate a suitable cooling medium, such as water.

The device is preferably used as a $CO_2$ laser, operating with a gas mixture typically consisting of xenon, carbon dioxide, nitrogen, and helium in the ratios of 0.4:1:1:5. The required fill pressure for optimum operation is:

$$pd=250$$

where "p" is the fill pressure in torr and "d" is the waveguide channel dimension in mm. For example, for a typical waveguide channel dimension of 2.0 mm, the fill pressure is 125 torr. Lasing gas of the desired type and composition at the desired pressure is admitted into metal box [190] through fill port [390], located here as an example on metal plate [193], but, alternatively, at any other convenient location on any side walls of metal box [190]. Fill port [390] can be sealed by means of a valve or, alternatively, it can be of standard pinch-off type.

A prototype M(8.5, 9) multiply folded laser has been constructed using a 99.5% aluminum oxide block, wherein a=1.078 cm and d=22.61 cm. The laser has the following characteristics:

$$L=617.3 \text{ cm}$$

$$N_s=N_r=33$$

$$N_c=136$$

Three of the fold mirrors are 3.35 inches long, 0.375 inches thick, and 0.500 inches high, and the fourth mirror is 3.70 inches long, with the same height and thickness. In all other respects, the laser cavity is built according to the multiply folded laser technology described in U.S. Pat. No. 4,815,094 (Cantoni) and U.S. Pat. No. 4,870,654 (Cantoni et al.), except that 12 inductors are used because of the use of the insert block.

The laser cavity was filled with a non-optimized mixture of $CO_2$, nitrogen, and helium (in ratio of 1:1:5), with 5 percent xenon added. Optical feedback was provided by a 100% reflector at one end of the laser cavity, and by a nonoptimized 30% reflectivity output coupler at the other end of the laser cavity.

In spite of the lack of voltage uniformity along the RF electrode, caused by nonoptimized vales of the resonating inductors and their locations, which resulted in one of the waveguide segments in the rectangular insert block remaining unlit, and in a less intense discharge intensity in some of the other segments in the insert block, a total output power of 212 W was achieved, with an electrical efficiency, at maximum power, of 10.5%. It is expected that an additional 20 to 30 Watts of power can be obtained after optimization of voltage uniformity along the RF electrode.

When an extended multiply folded laser structure is used which has an integral local oscillator obtained by any of the techniques described in this invention, additional optical ports (not shown) are required to house the total reflector and output coupler required for laser operation.

Although the preferred embodiments of this invention involve waveguide $CO_2$ lasers and amplifiers, the principles of this invention can be extended to other types of $CO_2$ laser resonators and amplifiers, to other gas compositions, and to other types of gaseous lasers and amplifiers. Also, many other alterations, modifications, and variations of the present invention will be apparent to those skilled in the art in light of the disclosure herein. It is intended that the metes and bounds of the invention be determined by the appended claims rather than by the language of the above specification, and that all the alternatives, modifications, and variations which form a function or conjointly cooperative equivalent are intended to be included within the spirit and scope of these claims.

I claim:

1. An optical apparatus comprising:
   (a) an active medium supporting laser action within a polygonal optical cavity;
   (b) a plurality of mirrors disposed to form the polygonal optical cavity including at least four mirrors forming at least two oblique pairs of mirrors;
   (c) means for guiding optical radiation generated within the optical cavity into each of the mirrors forming a multiply folded optical path; and
   (d) at least one insert block having a plurality of linear waveguides channels disposed between oblique pairs of mirrors to form an extended optical cavity.

2. The optical apparatus of claim 1, wherein the guiding means comprises a first and a second polygonal block having a plurality of waveguide channels disposed therein that are in alignment with the waveguide channels in the insert block.

3. The optical apparatus of claim 2, wherein the separation between channels in the polygonal blocks is congruent with the channels in the insert block.

4. The optical apparatus of claim 2, wherein the waveguide channels in the insert block are parallel to each other.

5. The optical apparatus of claim 4, wherein waveguide channels in the polygonal block are parallel with the waveguide channels in the insert block.

6. The optical apparatus of claim 1, wherein the insert block is disposed between a first and second blocks the first and second blocks and the insert block having a plurality of waveguide channels disposed therein, the waveguide channels in the insert block being in alignment with the waveguide channels in the first and second blocks.

7. The optical apparatus of claim 6, wherein the plurality of mirrors are disposed about the first and second polygonal blocks, one mirror being disposed on each side edge of the first and second polygonal blocks.

8. The optical apparatus of claim 6, wherein the spacing between the waveguide channels in the insert block is congruent with the spacing between channels in the first and second polygonal block portions.

9. A process for extending a multiply folded optical path in an optical cavity which comprises:
   (a) providing a plurality of mirrors disposed within the laser cavity including at least a first and a second mirror, the second mirror being oblique to the first mirror, the first and second mirrors being disposed about an area extending in two dimensions, each mirror having a reflective surface, the plurality of reflective surfaces forming a combined reflective surface;
   (b) directing optical radiation into the first and second mirrors defining the multiply folded optical path; and
   (c) expanding the multiply folded optical path without increasing the combined reflective surface.

10. The process of claim 9, further comprising providing a polygonal-shaped member having a plurality of waveguides channels disposed therein into the optical cavity, the waveguide channels extending in two dimensions.

11. The process of claim 9, further comprising providing a polygonal block and an insert block into the optical cavity, the polygonal block and the insert block each having a plurality of waveguide channels disposed therein, the waveguide channels in the insert block being in alignment with the waveguide channels in the polygonal block.

12. The process of claim 9, further comprising providing a first and second block portions, and an insert block into the optical cavity, the insert block being disposed between the first and second block portions, the first and second block portions and the insert block having a plurality of waveguide channels disposed therein, the waveguide channels in the insert block being in alignment with the waveguide channels in the first and second block portions.

13. An optical apparatus comprising:
   (a) an active medium supporting laser action within a polygonal optical cavity;
   (b) a plurality of mirrors disposed to form the polygonal optical cavity including at least four mirrors disposed to form at least a first and a second oblique pair of mirrors;
   (c) means for guiding optical radiation generated within the optical cavity into each of the mirrors forming a multiply folded optical path; and
   (d) at least two insert blocks each having a plurality of linear waveguide channels, a first insert block disposed between the first pair of oblique mirrors and a second insert block disposed between the second pair of oblique mirrors, thereby forming an extended optical cavity.

14. The optical apparatus of claim 13, wherein the guiding means comprises a first and second polygonal blocks having a plurality of waveguide channels disposed therein that are in alignment with the waveguide channels in the insert blocks.

15. The optical apparatus of claim 14, wherein flag channels in the polygonal blocks are congruent with the channels in the insert blocks.

16. The optical apparatus of claim 13, wherein the waveguide channels in at least two of the insert blocks are parallel to each other.

17. The optical apparatus of claim 13, wherein some of the waveguide channels in the polygonal block are parallel with some of the waveguide channels in the insert blocks.

* * * * *